US007922052B2

(12) United States Patent
Podschus

(10) Patent No.: US 7,922,052 B2
(45) Date of Patent: Apr. 12, 2011

(54) CARRYING STRAP ARRANGEMENT FOR SUPPORTING STRETCHERS IN LAND VEHICLES, AIRCRAFT AND WATERCRAFT

(75) Inventor: Thomas Podschus, Kiebitzreihe (DE)

(73) Assignee: AutoFlug GmbH (DE)

( * ) Notice: Subject to any disclaimer, the term of this patent is extended or adjusted under 35 U.S.C. 154(b) by 968 days.

(21) Appl. No.: 11/721,952

(22) PCT Filed: Dec. 8, 2005

(86) PCT No.: PCT/EP2005/013142

§ 371 (c)(1),
(2), (4) Date: Jun. 15, 2007

(87) PCT Pub. No.: WO2006/066735

PCT Pub. Date: Jun. 29, 2006

(65) Prior Publication Data

US 2009/0283562 A1 Nov. 19, 2009

(30) Foreign Application Priority Data

Dec. 17, 2004 (DE) ........................ 10 2004 060 791

(51) Int. Cl.
*B60R 9/00* (2006.01)

(52) U.S. Cl. ........................................................ 224/572

(58) Field of Classification Search .................. 224/572, 224/576, 578–580, 175, 254, 255, 539, 543, 224/563; 5/118; 383/33, 43, 119; 24/134, 24/68 CD See application file for complete search history.

(56) References Cited

U.S. PATENT DOCUMENTS

| | | | | | |
|---|---|---|---|---|---|
| 2,901,204 | A | * | 8/1959 | Davis | 248/229.13 |
| 5,402,557 | A | * | 4/1995 | Dalen | 24/68 CD |
| 5,423,644 | A | * | 6/1995 | First, Sr. | 410/100 |
| 5,437,401 | A | * | 8/1995 | Seltzer | 224/578 |
| 5,660,312 | A | * | 8/1997 | Suzuki | 224/627 |
| 5,809,620 | A | * | 9/1998 | Crowley et al. | 24/302 |
| 2003/0093884 | A1 | * | 5/2003 | Doty | 24/302 |
| 2008/0110002 | A1 | * | 5/2008 | Calkin et al. | 24/68 CD |
| 2009/0014483 | A1 | * | 1/2009 | Green et al. | 224/157 |

FOREIGN PATENT DOCUMENTS

| | | |
|---|---|---|
| DE | 220 362 | 3/1910 |
| FR | 1 420 524 | 11/1965 |
| GB | 761 083 | 11/1956 |

* cited by examiner

*Primary Examiner* — Nathan J Newhouse
*Assistant Examiner* — Corey N Skurdal
(74) *Attorney, Agent, or Firm* — Robert W. Becker; Robert Becker & Assoc.

(57) ABSTRACT

A carrying strap arrangement for use in supporting stretchers in land vehicles, aircraft, or watercraft. A carrying strap is attached to a vehicle ceiling and floor by fittings disposed at ends of the carrying strap. At least one support strap is disposed on the carrying strap and is formed into a strap loop to accommodate the carrying handle of the stretcher. The support strap is guided in a sliding manner through a pass-through fitting to form the strap loop. An end of the support strap is secured to the pass-through fitting such that under load the support strap is drawn through the fitting and the strap loop is constricted. A spring element is disposed in the strap loop and expands the strap loop when it is not loaded.

13 Claims, 2 Drawing Sheets

Figure 1:
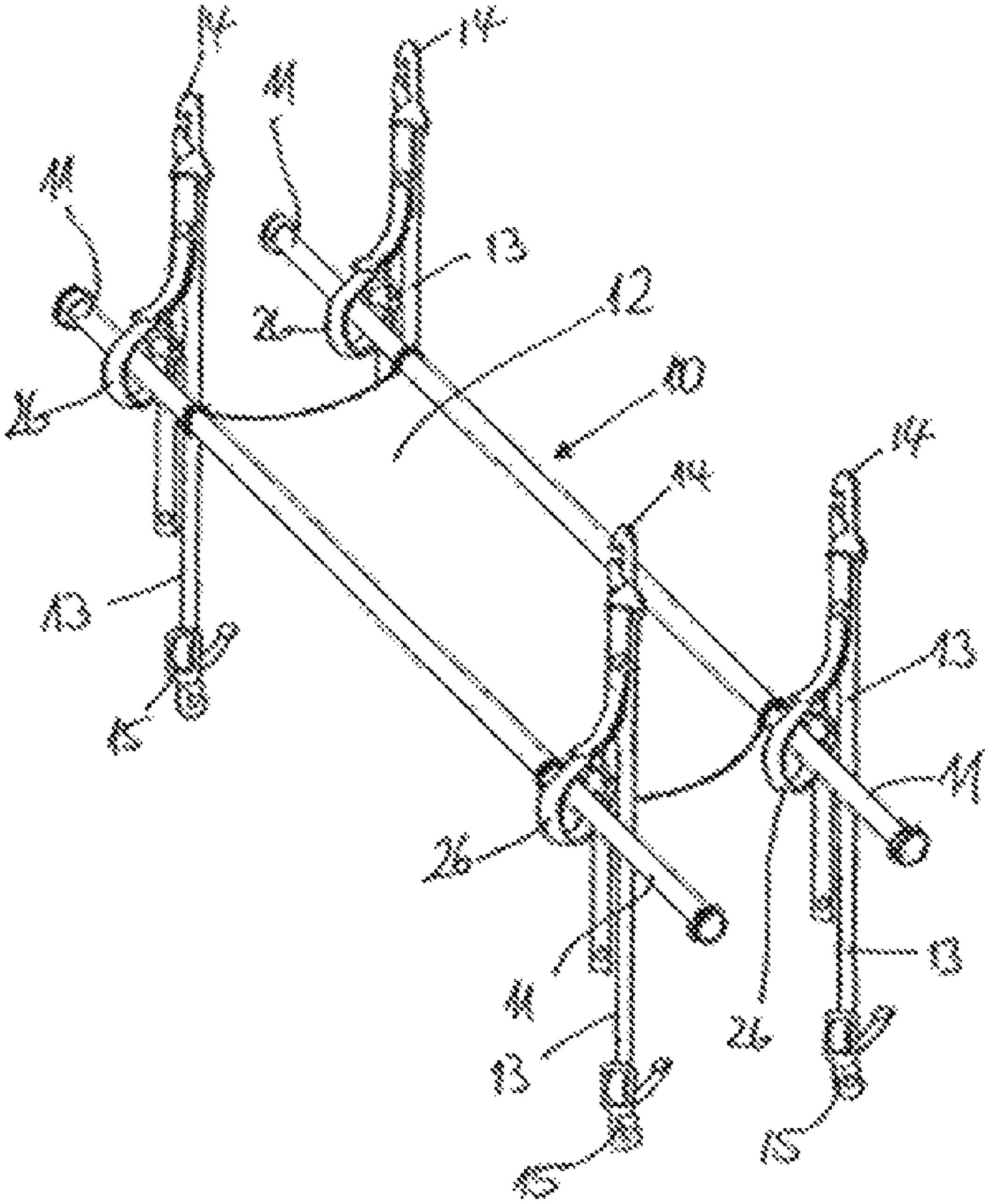

CARRYING STRAP ARRANGEMENT FOR SUPPORTING STRETCHERS IN LAND VEHICLES, AIRCRAFT AND WATERCRAFT

BACKGROUND OF THE INVENTION

The instant application should be granted the priority dates of Dec. 17, 2004, the filing date of the corresponding German patent application 10 2004 060 791.5, as well as Dec. 8, 2005, the filing date of the International patent application PCT/EP2005/1013142.

The present invention relates to a carrying strap arrangement for supporting stretchers in land vehicles, aircraft or watercraft, with a carrying strap that extends in a stretched manner between the ceiling and the floor of a vehicle, and that at its ends is to be fixed to the ceiling and the floor of the vehicle via respective fittings.

Such a carrying strap arrangement, which is known from use, serves to transport ill or injured people in land vehicles, aircraft or watercraft to the extent that such people must be moved on stretchers in a prone position. For this purpose, at a distance corresponding to the length of a stretcher, two carrying straps are associated with the front end of the stretcher and two further carrying straps are associated with the rear end of the stretcher, with the carrying straps being stretched between the ceiling and the floor of the vehicle. To support the stretcher on the carrying straps, metallic fittings are secured to the carrying straps; the carrying handles of the stretcher are supported in the metallic fittings.

Such a carrying strap arrangement has the drawback that the fittings used are heavy, require an appropriate storage space when the carrying strap arrangement is disassembled from the vehicle, and cause considerable cost in the design of the carrying strap arrangement. Furthermore, when the carrying strap arrangement is installed in the vehicle, the fittings present a danger of injury during rapid entry or exit from the vehicle. In addition, the fittings require additional handling effort during suspension of the stretcher in order to reliably secure the stretcher in the fittings during movement of the vehicle.

It is therefore an object of the present invention to simplify the construction and handling of the carrying strap arrangement of the aforementioned general type.

SUMMARY OF THE INVENTION

The inventive carrying strap arrangement is characterized in that at least one support strap is disposed on the carrying strap and is formed into a strap loop for accommodating the carrying handle of a stretcher, wherein for forming the strap loop, the support strap is guided in a sliding manner through a pass-through fitting, with its ends being secured to the pass-through fitting in such a way that under load conditions the support strap is drawn through the pass-through fitting and the strap loop constricts, whereby a spring element is inserted into the strap loop and expands the strap loop when it is in an unloaded condition. The invention has the advantage that the fittings required by the state of the art are replaced by a strap loop that is disposed on the respective carrying strap and in which the handle of a stretcher can be inserted; upon appropriate loading, the strap loop automatically constricts, thereby appropriately securing the carrying handle of the stretcher. To facilitate insertion of the carrying handle into the strap loop, a spring element that expands the strap loop prior to the insertion of the carrying handle is provided, so that the strap loop automatically assumes a shape that facilitates the insertion of the carrying handle. Such a carrying strap arrangement is provided with only few metallic fittings, is easy to produce and handle, and during disassembly from the vehicle requires only little storage space.

Pursuant to one embodiment of the invention, the pass-through fitting can be connected with the carrying strap, and can be attached thereto, via an elastic element in such a way that when the strap loop is not loaded, the strap loop is held in the position in which the inserted spring element expands the strap loop. The elastic element advantageously enhances the effect of the spring element inserted in the strap loop in that when the strap loop is not loaded, the elastic element also carries the pass-through fitting, so that during expansion of the strap loop the elastic element does not have to overcome the weight of the pass-through fitting required for the formation of the strap loop. In this connection, the elastic element can be in the form of a rubber strip that extends parallel to the support strap and with which the pass-through fitting on the one hand, and the carrying strap on the other hand, are connected. Pursuant to embodiments of the invention, the spring element that expands the strap loop can be a leaf-type spring or also an appropriately formed and functionally similar plastic component.

To improve the handling reliability of the inventive carrying strap arrangement, pursuant to an embodiment of the invention a safety strap having a fastener part attached to its free end can be connected to the pass-through fitting, and a corresponding fastener part can be attached to the carrying strap in such a way that when the strap loop is constricted, the safety strap can be secured to the carrying strap via the fastener and in so doing extends about the constricted strap loop, whereby pursuant to alternative embodiments, the fastener can be embodied as a snap-button fastener or a Velcro-type fastener or can be embodied in some other suitable manner. When vertical accelerations occur, accompanied by release of the strap loop, the safety strap, which is to be closed or is closed when the stretcher is inserted, prevents the automatic expansion of the strap loop due to the effect of the spring element inserted therein, or due to the elastic element that holds the pass-through fitting.

Pursuant to an embodiment of the invention, the safety strap can be optically distinguishable from the support strap. In this way, it is advantageously recognizable whether the safety strap is closed when the stretcher is inserted, and thus a safety function is fulfilled because when the strap loop is expanded prior to insertion of the stretcher, the safety strap hangs down freely from the pass-through fitting.

Pursuant to an embodiment of the invention, the support strap can be secured to the carrying strap; this is particularly applicable if with an appropriate height of the vehicle and length of the carrying strap, a plurality of supports are to be formed for accommodating stretchers that are to be supported one above the other, wherein pursuant to one embodiment of the invention, a plurality of support straps, with associated strap loops, are provided.

Alternatively, the support strap can be a monolithic component of the carrying strap, which extends over the upper fitting that is provided for anchoring to the ceiling of the vehicle; this simplifies the production of the carrying strap arrangement. Where the carrying strap and the support strap are monolithic with one another, the carrying strap is to be secured to the upper fitting that serves for anchoring the carrying strap to the ceiling of the vehicle, and is preferably to be connected to itself in a loop guided through the fitting. In a similar construction, the safety strap can be a monolithic component of the support strap, which is guided beyond the pass-through fitting; here also the end of the support strap, which is formed either separately or monolithically with the carrying strap, is secured to the pass-through fitting and is extended as a monolithically adjoining safety strap.

Pursuant to an embodiment of the invention, the carrying strap is secured to the upper fitting that is provided for the ceiling anchoring, and the fitting provided for the floor anchoring is provided with an adjustment means for tensioning the carrying strap.

BRIEF DESCRIPTION OF THE INVENTION

Figure 2:
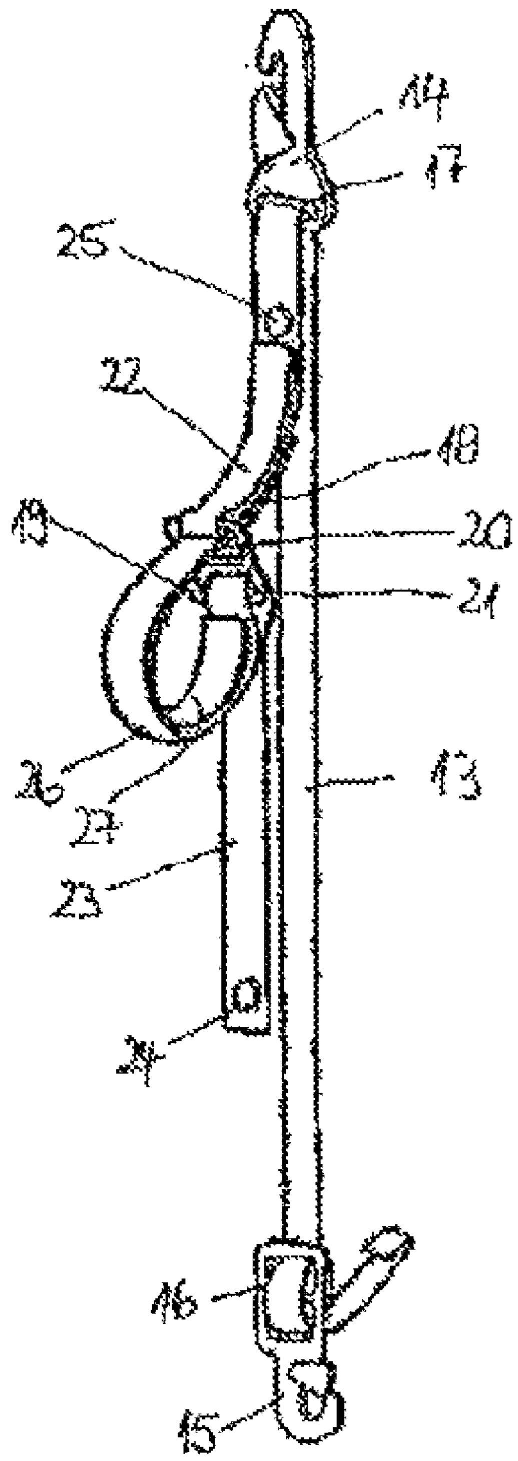

One embodiment of the invention will be described subsequently and is shown in the drawings, in which:

FIG. 1 shows a stretcher supported in carrying strap arrangements respectfully associated with the outer carrying handles of the stretcher, FIG. 2 is an enlarged detailed illustration of a single carrying strap arrangement having a strap loop that serves for the support of the stretcher.

DESCRIPTION OF PREFERRED EMBODIMENTS

As can initially be seen from FIG. 1, the four corner regions of a stretcher or litter 10 are provided with carrying handles 11 that extend beyond a support or carrying material or cloth 12 that is stretched between two rod elements. Each individual carrying handle 11 is inserted into a strap loop 26 of a respectively associated carrying strap 13, whereby in the position shown in FIG. 1, the stretcher 10 is not loaded, so that also the strap loops 26, which are respectively formed on the carrying straps 13, are not yet contracted or constricted, as occurs upon loading of the stretcher 10 when a person rests upon the support material 12.

As shown in detail in FIG. 2, the carrying strap 13, which is stretched vertically in a non-illustrated vehicle, has its upper end connected to an upper fitting 14, which is embodied, for example, as a snap or carabiner-type hook, and which can be mounted in an appropriate eye or loop that is formed on the non-illustrated vehicle. Similarly, disposed at the low end of the carrying strap 13 is a lower fitting 15, which is also formed as a snap or carabiner-type hook, and which includes an adjustment means 16 via which the carrying strap can be made taut between the fittings 14 and 15 that are secured to the vehicle. Such adjustment means that block return are known, so that no further discussion thereof will be provided.

At its upper end, the carrying strap 13 is guided and undergoes a change in direction through a strap slot 17 that is formed in the upper fitting 14, and is subsequently secured to itself in a non-illustrated manner so that the carrying strap 13 is fixed to the upper fitting 14. The free end of the carrying strap 13 merges into a support strap 18 which, by means of a pass-through fitting disposed thereon, is formed into a strap loop 26. For this purpose, the support strap 18 is guided through a pass-through slot 20 of the pass-through fitting 19 and is secured to a securement slot 21 of the pass-through fitting 19, whereby the support strap 18 is provided between the pass-through slot 20 and the securement slot 21 with the length required for forming the strap loop 26. A spring element 27, formed for example as a leaf-type spring, is placed in the strap loop 26, and is connected with the support strap 18, in such a way that when the carrying strap arrangement is not loaded, as illustrated in FIG. 2, the spring element 27 expands or spreads the strap loop 26 and holds it in a shape in which a carrying handle 11 of a stretcher 10 can easily be inserted into the strap loop 26. In addition, the pass-through fitting 19 is connected to the carrying strap 13 via a rubber strip 22, as a resilient element, that extends parallel to the support strap 18 so that the weight of the pass-through fitting 19 is on the one hand carried by the rubber strip 22, and on the other hand is also supported by the spring element 27 that is disposed in the strap loop 26. However, if the strap loop 26 is loaded by an inserted carrying handle 11 of a stretcher 10 that is loaded with a person, the strap loop 26 automatically draws together or constricts and thereby also tensions the rubber strip 22 since the pass-through fitting 19, with the support strap 18 passing through the pass-through slot 20 of the pass-through fitting 19, shifts in the direction of the lower fitting 15, and thereby draws together. After release of the strap loop 26, the rubber strip 22 again pulls the pass-through fitting 19 upwardly, and in this connection is facilitated by the effect of the spring element 27 found in the strap loop 26.

Additionally, a safety strap 23 that adjoins the pass-through fitting 19 is provided, whereby in the illustrated embodiment the safety strap 23 is a monolithic component of the support strap 18 that continues beyond the pass-through fitting 19. In the same way as described with respect to the one-piece nature of the carrying strap 13 and the support strap 18, the support strap is secured in the securement slot 21 of the pass-through fitting 19 accompanied by the formation of a loop formed by a securement of the associated portions of the support strap 18 to one another; the support strap then continues further as the safety strap 23 that is independent of the pass-through fitting 19. At its free end, the safety strap 23 is provided with a first fastener part 24 with which is associated a second fastener part 25 in the upper region of the carrying strap 13 to form a cooperative fastener. These fastener parts can be embodied as a snap-button fastener or a Velcro-type fastener. The length of the safety strap 23 is such that when the strap loop 26 is constricted, the safety strap is guided about the support strap 18 that forms the strap loop 26 and is secured to the carrying strap 13, whereby the safety strap 23 extends closely about the loaded and constricted strap loop 26. In this way, when negative vertical accelerations are encountered that would lead to a relaxing of the strap loop 26, and hence to an expansion of the strap loop 26, the safety strap 23 prevents such an expansion or spreading, which could lead to a slipping of the carrying handle 11 of the stretcher 10 out of the strap loop 26. If pursuant to one embodiment the safety strap 23 is distinguishable from the remainder of the strap used to produce the carrying strap 13 and the support strap 18, it is easy to recognize, when the stretcher 10 is inserted, whether the carrying strap arrangement is protected in the prescribed manner.

The specification incorporates by reference the disclosure of German 10 2004 060 791.5 filed Dec. 17, 2004, as well as International application PCT/EP2005/013142, filed Dec. 8, 2005.

The present invention is, of course, in no way restricted to the specific disclosure of the specification and drawings, but also encompasses any modifications within the scope of the appended claims.

The invention claimed is:

1. A carrying strap arrangement for use in supporting a stretcher (10) in a land vehicle, aircraft or watercraft, comprising:

a carrying strap (13) having ends;

respective fittings (14, 15) disposed at said ends of said carrying strap (13) for attachment to a ceiling and a floor of the vehicle such that said carrying strap (13) is adapted to be stretched between the ceiling and the floor;

at least one support strap (18) disposed on said carrying strap (13) and formed into a strap loop (26) adapted to accommodate a carrying handle (11) of the stretcher (10);

a pass-through fitting (19), wherein said support strap (18) is guided in a sliding manner through said pass-through fitting (19) to form said strap loop (26), and wherein an end of said support strap (18) is secured to said pass-through fitting (19) such that under load conditions, said support strap (18) is adapted to be drawn through said pass-through fitting (19) and said strap loop (26) is adapted to be constricted; and a spring element (27) disposed in said strap loop (26), wherein in an unloaded condition of said strap loop said spring element (27) is adapted to expand said strap loop (26).

2. A carrying strap arrangement according to claim 1, wherein an elastic element (22) is provided, and wherein said pass-through fitting (19) is connected to said carrying strap (13), and is attached thereto, in such a way via said elastic element (22) that in said unloaded condition of said strap loop (26), said strap loop is held in a position in which said spring element expands said strap loop (26).

3. A carrying strap arrangement according to claim 2, wherein said spring element (27) is a leaf-type spring.

4. A carrying strap arrangement according to claim 2, wherein said elastic element (22) is a rubber strip.

5. A carrying strap arrangement according to claim 1, wherein a safety strap (23) is connected to said pass-through fitting (19), wherein a fastener (24, 25) is provided that is composed of a first fastener part (24), which is attached to a free end of said safety strap (23), and a corresponding second fastener part (25), which is attached to said carrying strap (13) in such a way that when said strap loop (26) is constricted, said safety strap (23) is adapted to be secured to said carrying strap (13) via said fastener (24, 25), and wherein in so doing said safety strap (23) extends about the constricted strap loop (26).

6. A carrying strap arrangement according to claim 5, wherein said fastener (24, 25) is a snap-button fastener.

7. A carrying strap arrangement according to claim 5, wherein said fastener (24, 25) is a Velcro-type fastener.

8. A carrying strap arrangement according to claim 5, wherein said safety strap (23) is optically distinguishable from the support strap (5)

9. A carrying strap arrangement according to claim 1, wherein said support strap (5) is secured to said carrying strap (13).

10. A carrying strap arrangement according to claim 1, wherein said support strap (18) is a monolithic component of said carrying strap (13), and wherein said carrying strap (13) extends over an upper one of said fittings (1) that is provided for an anchoring to the ceiling of the vehicle.

11. A carrying strap arrangement according to claim 5, wherein said safety strap (23) is a monolithic component of said support strap (18), and wherein said support strap is guided beyond said pass-through fitting (19),

12. A carrying strap arrangement according to claim 1, wherein said carrying strap (13) is secured to an upper one of said fittings (14), that is provided for an anchoring to the ceiling of the vehicle, and wherein one of said fittings (15) that is provided for an anchoring to the floor of the vehicle is provided with an adjustment means (16) for a tensioning of said carrying strap (13).

13. A carrying strap arrangement according to claim 1, wherein a plurality of said support straps (18) having associated strap loops (26) are disposed over a length of said carrying strap (13) that is stretched between the ceiling of the vehicle and the floor of the vehicle.

* * * * *